United States Patent
Evans et al.

(10) Patent No.: US 10,352,345 B2
(45) Date of Patent: Jul. 16, 2019

(54) ADHESIVE-BONDED ATTACHMENT DEVICE

(71) Applicant: The Boeing Company, Chicago, IL (US)

(72) Inventors: Nick S. Evans, Lynnwood, WA (US); Lenny E. Lay, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 346 days.

(21) Appl. No.: 15/369,059

(22) Filed: Dec. 5, 2016

(65) Prior Publication Data

US 2018/0154583 A1 Jun. 7, 2018

(51) Int. Cl.
*F16B 11/00* (2006.01)
*F16B 37/04* (2006.01)

(52) U.S. Cl.
CPC .......... *F16B 11/006* (2013.01); *F16B 37/048* (2013.01); *Y10S 24/11* (2013.01); *Y10T 24/33* (2015.01); *Y10T 428/14* (2015.01)

(58) Field of Classification Search
CPC .... F16B 11/006; F16B 37/048; Y10T 428/14; Y10T 24/33; Y10S 24/11
See application file for complete search history.

(56) References Cited

U.S. PATENT DOCUMENTS

| | | | | |
|---|---|---|---|---|
| 4,302,492 A * | 11/1981 | Hutter, III | ............... | B29C 73/10 428/40.1 |
| 4,338,151 A * | 7/1982 | Hutter, III | ........... | B29C 65/7855 156/719 |
| 4,390,576 A * | 6/1983 | Hutter, III | ........... | B29C 65/7855 156/247 |
| 4,668,546 A * | 5/1987 | Hutter, III | ........... | B29C 65/7855 156/247 |
| 4,822,656 A * | 4/1989 | Hutter, III | ........... | B29C 65/7855 156/247 |
| 5,593,120 A * | 1/1997 | Hamerski | ........... | B29C 65/0672 156/235 |
| 7,294,385 B1 * | 11/2007 | Stephen | ................ | F16B 11/006 156/71 |
| 8,141,829 B2 * | 3/2012 | Hutter, III | ............. | F16B 11/006 24/304 |
| 2003/0116282 A1 * | 6/2003 | Hutter, III | ............. | F16B 11/006 156/380.2 |
| 2012/0230801 A1 * | 9/2012 | Condliff | .................... | B25B 5/06 411/511 |

OTHER PUBLICATIONS

Click Bond fasteners (enfasco.com).
Swiftbond™ Adhesive Bonded Fasteners (http://www.esterline.com/Portals/8/NMC/PDF/swiftbond_07.pdf).

* cited by examiner

*Primary Examiner* — Carson Gross
(74) *Attorney, Agent, or Firm* — Walters & Wasylyna LLC

(57) ABSTRACT

An adhesive-bonded attachment device includes a mounting base including a mounting surface, a structural adhesive disposed on the mounting surface, and a pressure-sensitive adhesive disposed on the mounting surface bordering the structural adhesive, wherein the structural adhesive and the pressure-sensitive adhesive define a bonding surface configured to be bonded to a contact surface of a structure, and an attachment feature disposed on said mounting base.

20 Claims, 12 Drawing Sheets

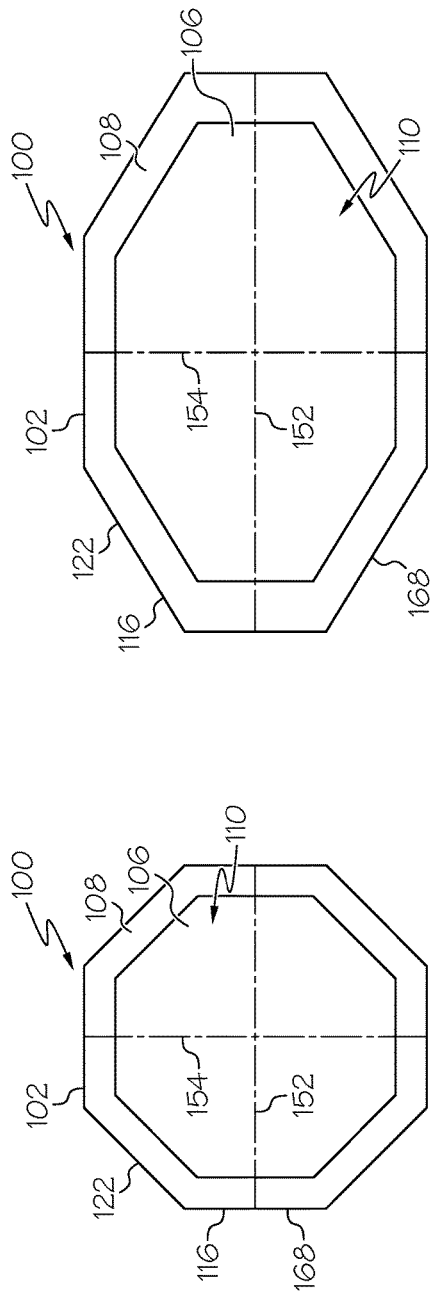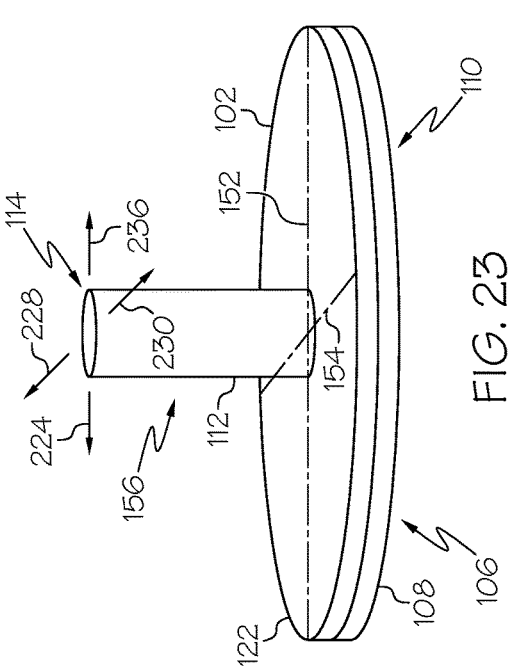

ADHESIVE-BONDED ATTACHMENT DEVICE

FIELD

The present disclosure is generally related to devices for attaching components of a system together and, more particularly, to an adhesive-bonded attachment device that utilizes a two-phase adhesive system.

BACKGROUND

In many manufacturing operations, articles must be attached to an underlying structure. As an example, in an aerospace application, various types of transmission lines and other system components need to be attached to an underlying structure of an aircraft. As an example, the system components are attached to the structure by mechanical fasteners installed into the structure. However, drilling holes in the structure of the aircraft for installation of the mechanical fasteners is labor intensive and may create undesirable stress concentrations about the hole. As another example, the system components are attached to the structure by fasteners that are adhesively bonded to a surface of the structure. However, the process of bonding the fastener to the structure is also labor intensive and requires applying an adhesive to the fastener, seating the fastener on the surface of the structure, clamping the fastener to the surface of the structure with a separate clamping fixture to apply pressure to the adhesive and removing the clamping fixture after the adhesive has cured. Thus, either fastening technique has disadvantages related to process time, quality assurance and cost.

Accordingly, those skilled in the art continue with research and development efforts in the field of attachment devices.

SUMMARY

In one embodiment, the disclosed adhesive-bonded attachment device includes a mounting base including a mounting surface, a structural adhesive disposed on the mounting surface, and a pressure-sensitive adhesive disposed on the mounting surface bordering the structural adhesive, wherein the structural adhesive and the pressure-sensitive adhesive define a bonding surface configured to be bonded to a contact surface of a structure, and an attachment feature disposed on the mounting base.

In another embodiment, the disclosed adhesive-bonded attachment device includes a mounting base including a mounting surface, a pressure-sensitive adhesive disposed on the mounting surface, wherein the pressure-sensitive adhesive and a portion of the mounting surface define a cavity, and a structural adhesive disposed within the cavity and bordered by the pressure-sensitive adhesive, wherein the structural adhesive and the pressure-sensitive adhesive define a bonding surface configured to be bonded to a contact surface of a structure, an attachment feature disposed on the mounting base, wherein the attachment feature includes a fastening fixture opposite the mounting base, and at least one pressure exhaust port extending through the mounting base to the cavity, wherein the pressure exhaust port maintains a constant positive pressure on the structural adhesive when the pressure-sensitive adhesive is bonded to the contact surface of the structure.

In yet another embodiment, the disclosed method for attaching an article to a structure includes the steps of: (1) seating a mounting base of an adhesive-bonded attachment device upon the structure such that a bonding surface of the mounting base engages a contact surface of the structure, wherein the mounting base includes a mounting surface, a pressure-sensitive adhesive disposed on the mounting surface, the pressure-sensitive adhesive and a portion of the mounting surface defining a cavity, and a structural adhesive disposed within the cavity and bordered by the pressure-sensitive adhesive, the structural adhesive and the pressure-sensitive adhesive defining the bonding surface, (2) applying an external force to the mounting base, (3) bonding the pressure-sensitive adhesive to the contact surface of the structure, (4) applying a clamping force to the structural adhesive, (5) curing the structural adhesive, (6) permanently bonding the structural adhesive to the contact surface of the structure, and (7) attaching the article to a fastening fixture disposed on an end of a post extending from the mounting base.

Other embodiments of the disclosed apparatus and method will become apparent from the following detailed description, the accompanying drawings and the appended claims.

BRIEF DESCRIPTION OF THE DRAWINGS

FIG. 21 is a schematic bottom plan view of another embodiment of the disclosed adhesive-bonded attachment device;

FIG. 22 is a schematic bottom plan view of another embodiment of the disclosed adhesive-bonded attachment device;

FIG. 23 is a schematic perspective view of another embodiment of the disclosed adhesive-bonded attachment device;

DETAILED DESCRIPTION

Figure 1:
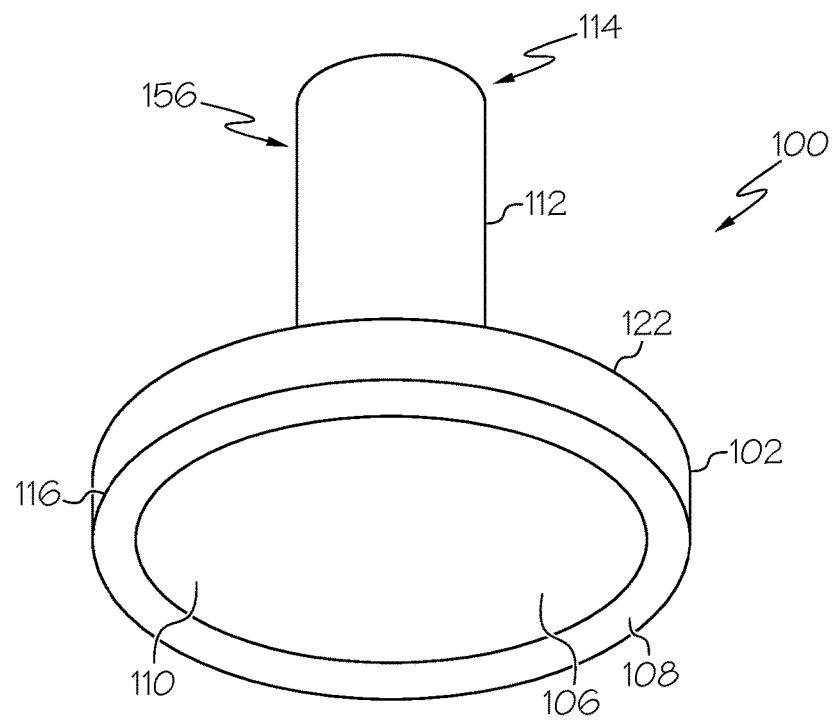
FIG. 1 is a schematic side and bottom perspective view of an embodiment of the disclosed adhesive-bonded attachment device.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

Illustrative, non-exhaustive embodiments, which may be, but are not necessarily, claimed, of the subject matter according the present disclosure are provided below.

Figure 2:
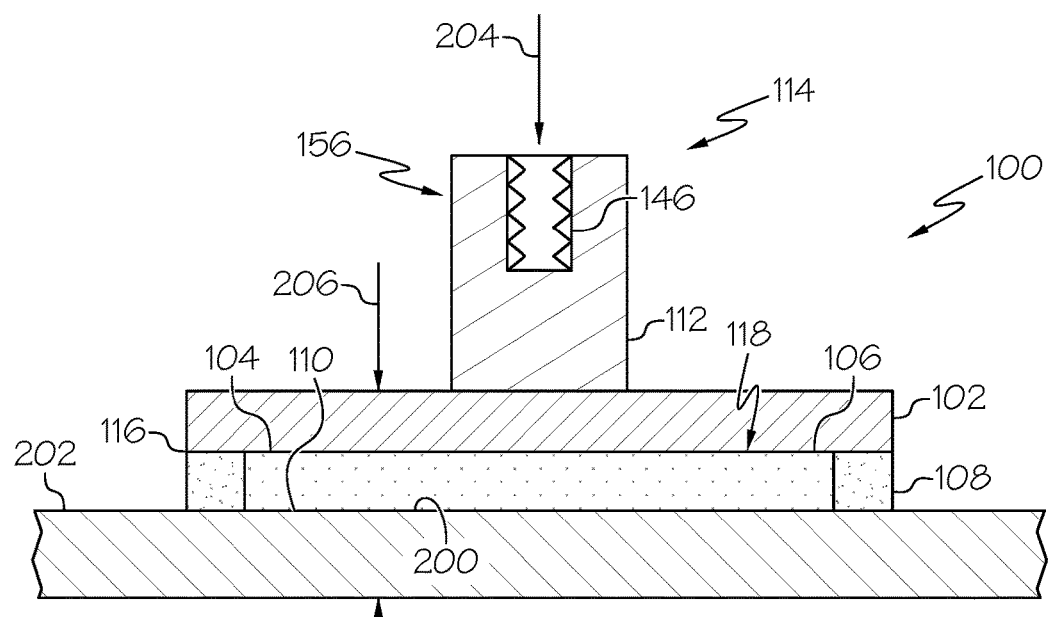
FIG. 2 is a schematic side elevation view, in section, of another embodiment of the disclosed adhesive-bonded attachment device.

FIG. 1 is a schematic side and bottom perspective view of an embodiment of the disclosed adhesive-bonded attachment device, generally referred to herein as the device 100. FIG. 2 is a schematic side elevation view, in section, of another embodiment of the disclosed device 100. Generally, the device 100 is configured for the attachment of an article or a component to a contact surface 200 of a structure 202. The device 100 utilizes a two-phase adhesive system that enables rapid and accurate installation of the device 100 on the structure 202.

As a specific example, the device 100 is configured for the attachment of a component of an aerospace system to the structure of an aircraft. In this aerospace example, the device 100 may also be referred to as a transport element. As examples, the article or component may include, without limitation, an instrument or component of an instrumentation system, an electronic device or component (e.g., a light-emitting diode), a wire or bundle of wires for electrical or data transfer systems, tubing for environmental control systems and the like. In an example, the article or component may be attached directly to the device 100. In another example, the article or component may be attached to the device 100 using a secondary fastening mechanism, such as a mechanical fastener, a bracket, a cable tie and the like.

The device 100 includes a mounting base 102. The mounting base 102 includes a mounting surface 104 (e.g., a bottom surface) (FIG. 2). The mounting base 102 also includes a structural adhesive 106 disposed on the mounting surface 104. The mounting base 102 also includes a pressure-sensitive adhesive 108 disposed on the mounting surface 104 bordering the structural adhesive 106 (e.g., along a perimeter of the mounting base 102). The structural adhesive 106 and the pressure-sensitive adhesive define a bonding surface 110 configured to be bonded to a contact surface 200 of a structure 202 (FIG. 2).

As used herein, the term "structural adhesive" has its ordinary meaning known to those skilled in the art and may include an adhesive that hardens to form a permanent bond and produce a load-bearing joint. As an example, the structural adhesive 106 is a curable adhesive that hardens via a reaction to ultraviolet (UV) light. As another example, the structural adhesive 106 is a curable adhesive that hardens via a reaction to a heating and cooling cycle (e.g., hot melt). As another example, the structural adhesive 106 is a curable adhesive that hardens via a chemical reaction. For example, the structural adhesive 106 may be a two-component adhesive system that is mixed together and cures, for example, at room temperature, via the chemical reaction between the two components. As yet another example, the structural adhesive 106 is a flowable adhesive that is cured by one of a UV light reaction, a heating/cooling cycle reaction, a chemical reaction or the like.

As used herein, the term "pressure-sensitive adhesive" has its ordinary meaning known to those skilled in the art and may include an adhesive that forms a bond when pressure is applied. As an example, the pressure-sensitive adhesive 108 is a pressure-sensitive adhesive tape that includes a pressure-sensitive adhesive material coated onto a backing material such as paper or a plastic film. The pressure-sensitive adhesive 108 may be a single-sided tape or a double-sided tape. The pressure-sensitive tape may also include a removable release liner that protects the adhesive material until the liner is removed. As another example, the pressure-sensitive adhesive 108 is a pressure-sensitive glue.

The device 100 also includes an attachment feature 156 disposed on the mounting base 102. As an example, the attachment feature 156 may be disposed on an exterior surface 158 (e.g., a top surface or side surface) of the mounting base 102. As an example, the attachment feature 156 may be located opposite the mounting surface 104. The attachment feature 156 is configured to provide an attachment interface for attachment of the article or component to the device 100 and, thus, also to the structure 202. As an example, the attachment feature 156 includes a fastening fixture 114 configured for attachment of the article or component to the attachment feature 156 to the device 100. In an example, the fastening fixture 114 may be configured to engage or otherwise connect directly to the article or component. In another example, the fastening fixture 114 may be configured to engage or otherwise connect to a secondary fastener that is directly connected to the article or component. In this example, the fastening fixture 114 may be any suitable fastening mechanism.

Figure 3:
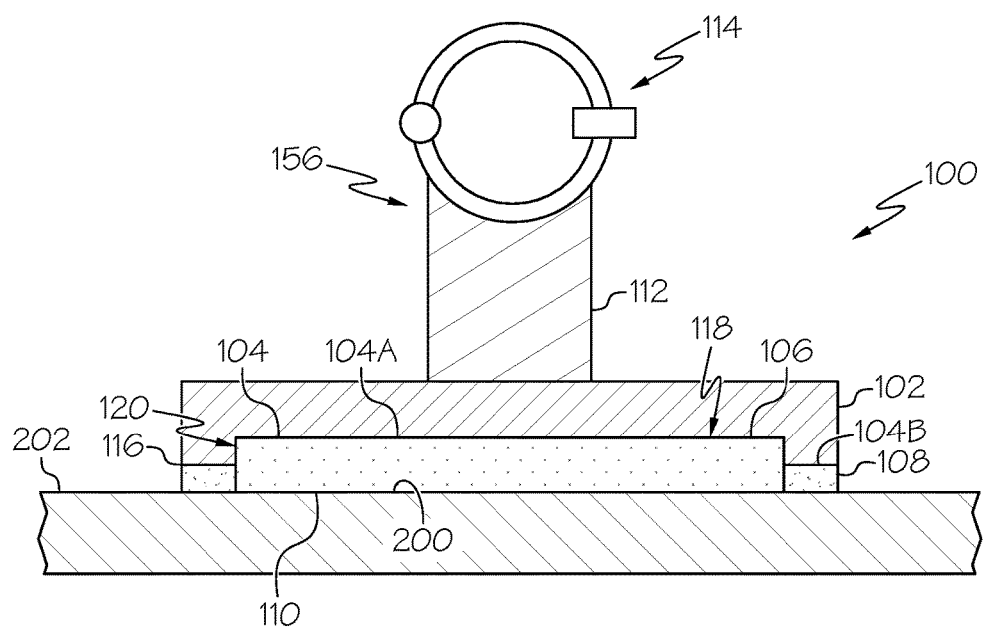
FIG. 3 is a schematic side elevation view, in section, of another embodiment of the disclosed adhesive-bonded attachment device.
Figure 4:
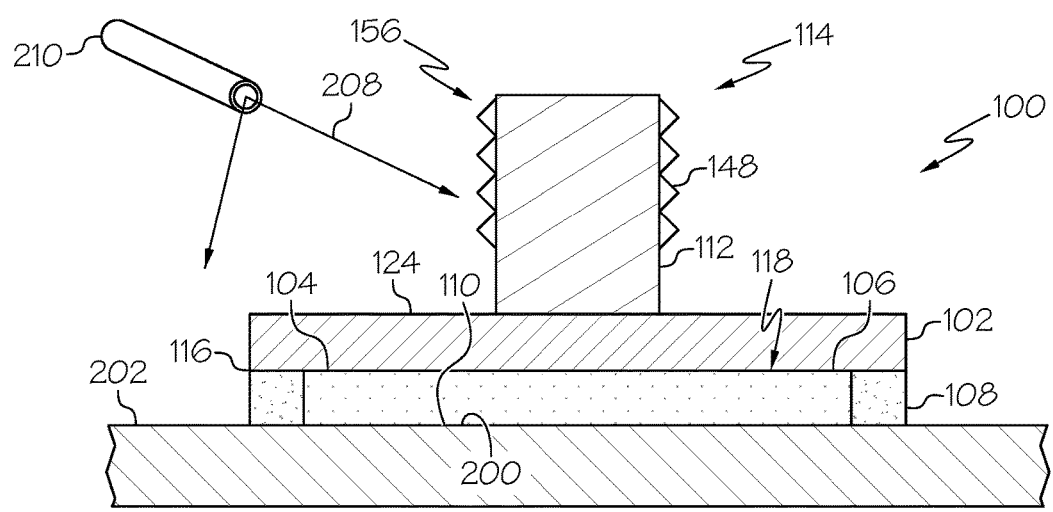
FIG. 4 is a schematic side elevation view, in section, of another embodiment of the disclosed adhesive-bonded attachment device.

In the various embodiments illustrated in FIGS. 1-10, the attachment feature 156 may include, or take the form of, a post 112 extending from (e.g., the top surface of) the mounting base 102 opposite the mounting surface 104. In this example, the fastening fixture 114 may be disposed on an end of the post 112 opposite the mounting base 102. As an example, and as illustrated in FIG. 2, the fastening fixture 114 may be an internal thread 146 disposed at least partially through the attachment feature 156, for example, an internally threaded bore in the end of the post 112. In this example, the internally threaded bore 146 may be connected to a threaded shank of a fastener or an externally threaded portion of the article or component. As another example, and as illustrated in FIG. 4, the fastening fixture 114 may be an external thread 148 disposed on at least a portion of the attachment feature 156, for example, an externally threaded end of the post 112. In this example, the externally threaded end 148 may be connected to an internally threaded bore of a fastener or of the article or component. As yet another example, and as illustrated in FIG. 3, the fastening fixture 114 may be a clamp 150 (e.g., a clamshell clamp, a C-clamp, a band clamp and the like), for example, disposed at the end of the post 112. In this example, the clamp 150 may wrap around and/or bond the article or component.

Figure 11:
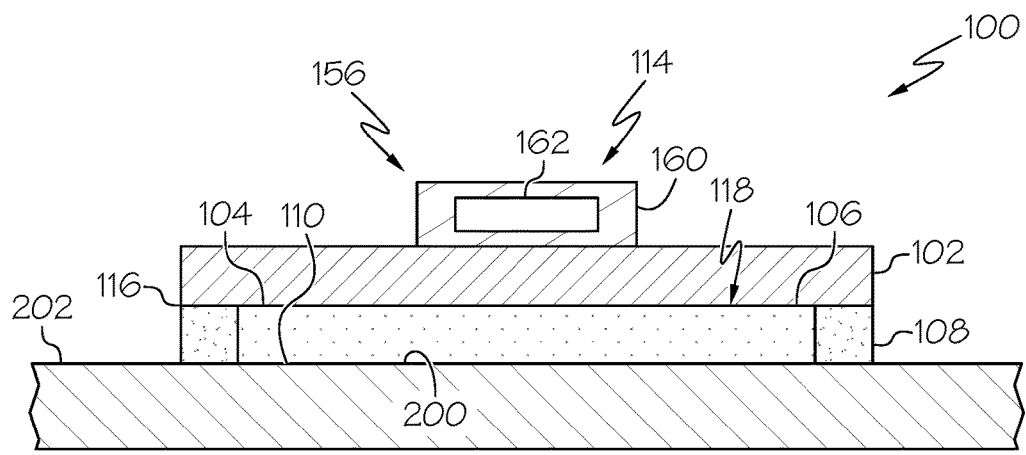
FIG. 11 is a schematic side elevation view, in section, of another embodiment of the disclosed adhesive-bonded attachment device.

FIG. 11 is a schematic side elevation view, in section, of another embodiment of the disclosed device 100. In another example, and as illustrated in FIG. 11, the attachment feature 156 may include, or take the form of, a bracket 160 connected, or integral to, the exterior surface 158 (e.g., the top surface) of the mounting base 102, for example, opposite the mounting surface 104. In an example, the fastening fixture 114 includes a slot 162 formed through the bracket 160. In this example, the slot 162 may receive a cable tie that connects the article or component to the bracket 160.

Figure 12:
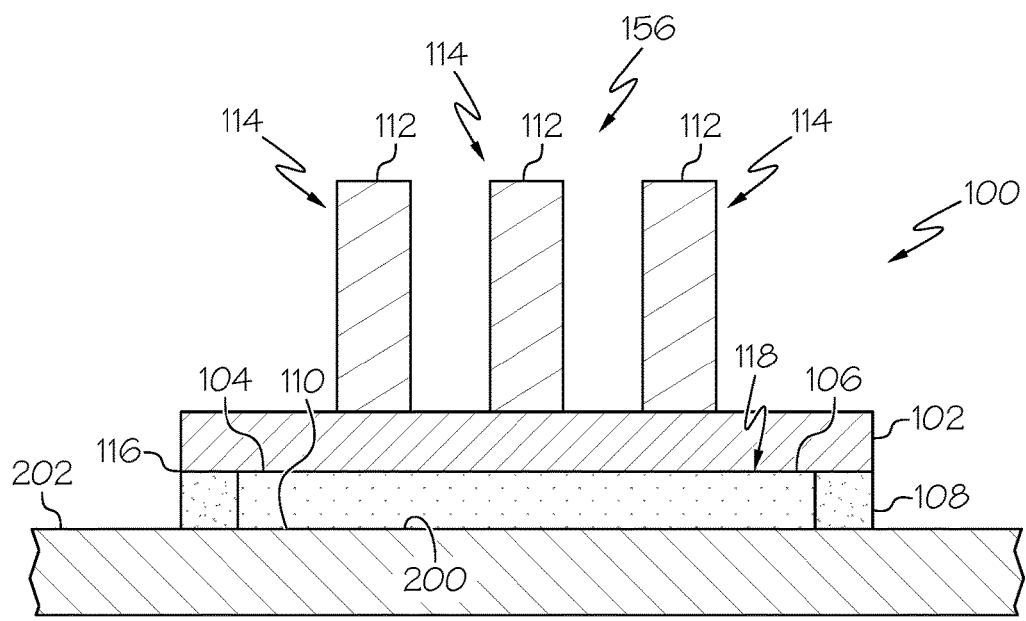
FIG. 12 is a schematic side elevation view, in section, of another embodiment of the disclosed adhesive-bonded attachment device.

FIG. 12 is a schematic side elevation view, in section, of another embodiment of the disclosed device 100. In another example, as illustrated in FIG. 12, the attachment feature 156 may include, or take the form of, a plurality of posts 112 (three posts 112 are shown by example). In this embodiment, each post 112 includes the fastening fixture 114.

Figure 13:
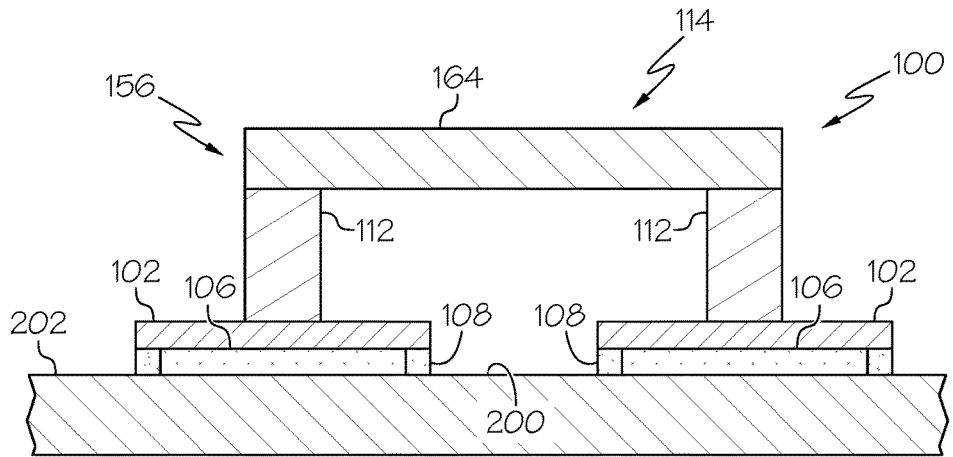
FIG. 13 is a schematic side elevation view, in section, of another embodiment of the disclosed adhesive-bonded attachment device.

FIG. 13 is a schematic side elevation view, in section, of another embodiment of the disclosed device 100. In another example, as illustrated in FIG. 13, the device 100 may include a plurality of mounting bases 102 (two mounting bases 102 are shown by example). In an example, the attachment feature 156 includes a bridge 164 extending between and interconnecting the plurality of mounting bases 102, for example, interconnecting a plurality of posts 112 extending from a respective mounting base 102. In this example, the bridge 164 may include one or more fastening fixtures 114.

In the various disclosed embodiments, the bonding surface 110 of the mounting base 102, defined by the pressure-sensitive adhesive 108 and the structural adhesive 106, is configured to be placed in flush contact and parallel with the contact surface 200 of the structure 202. As an example embodiment, and as illustrated in FIGS. 2-13, the entire bonding surface 110 of the mounting base 102, defined by the pressure-sensitive adhesive 108 and the structural adhesive 106, is planar (e.g., being a two-dimensional in quality and lying in a virtual plane) and configured to be placed in flush contact and parallel with the contact surface 200 of the structure 202 that is also planar. In other embodiments, the bonding surface 110 of the mounting base 102 is non-planar and configured to be placed in flush contact and parallel with a portion of the contact surface 200 of the structure 202 that is also non-planar.

Figure 14:
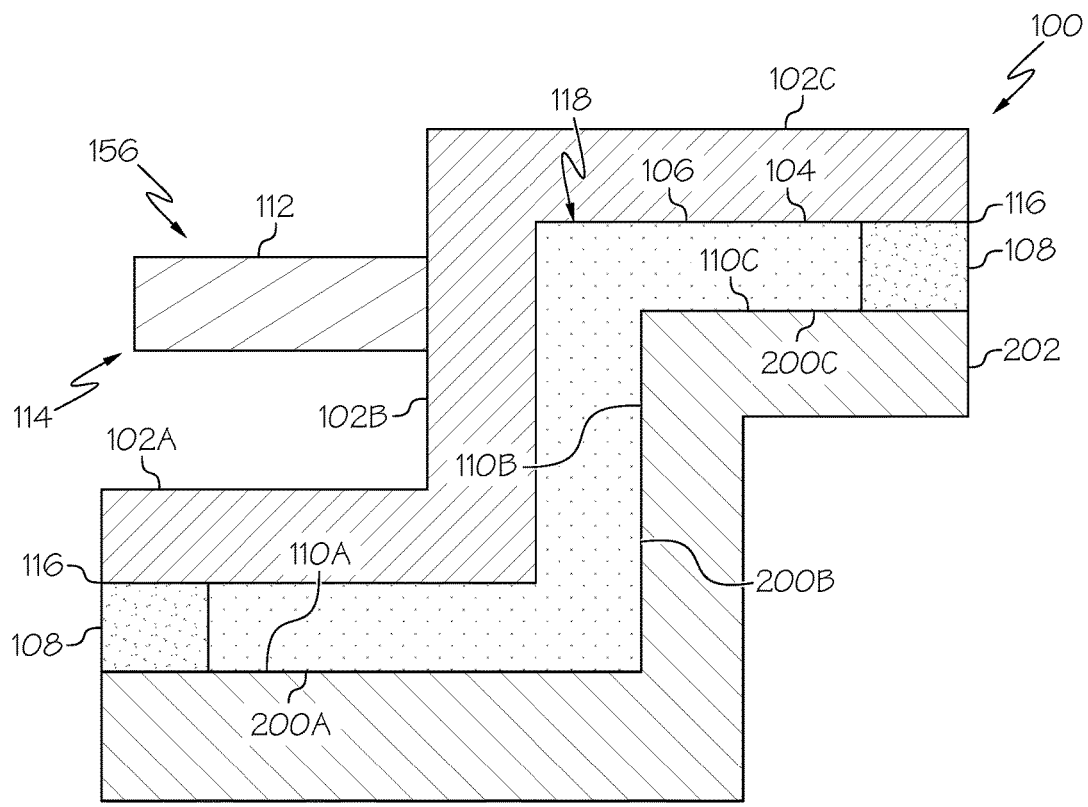
FIG. 14 is a schematic side elevation view, in section, of another embodiment of the disclosed adhesive-bonded attachment device.

FIG. 14 is a schematic side elevation view, in section, of another embodiment of the disclosed device 100. In another example, as illustrated in FIG. 14, the mounting base 102 has a non-uniform shape, for example, including a plurality of portions of the mounting base 102, identified individually in FIG. 14 as a mounting base-first portion 102A, a mounting base-second portion 102B and a mounting base-third portion 102C. In this example, portions of the bonding surface 110, identified individually in FIG. 14 as a bonding surface-first portion 110A, a bonding surface-second portion 110B and a bonding surface-third portion 110C, of the mounting base 102 are configured to be placed in flush contact and parallel with corresponding portions of the contact surface 200, identified individually in FIG. 14 as a contact surface-first portion 200A, a contact surface-second portion 200B and a contact surface-third portion 200C, of the structure 202 that is also non-planar. As an example, each portion of the mounting base 102, or bonding surface 110, may be perpendicular to an adjacent portion of the mounting base 102, or bonding surface 110, as illustrated in FIG. 14, to be placed in flush contact and parallel with corresponding portions of the contact surface 200. In an example of this embodiment, the structure 202 may be a stringer structure of an airframe of an aircraft. As another example (not shown), one or more portions of the mounting base 102, or bonding surface 110, may be oblique to an adjacent portion of the mounting base 102, or bonding surface 110, to be placed in flush contact and parallel with corresponding portions of the contact surface 200.

Other configurations of the mounting base 102 and/or other types of the attachment feature 156 and fastening fixture 114 are also contemplated.

Referring to FIG. 2, the pressure-sensitive adhesive 108 is configured to form a bond with the contact surface 200 of the structure 202 in response to an external force 204, or pressure, applied to the mounting base 102 (e.g., perpendicular to the mounting surface 104). The mounting surface 104 is configured to apply a continuous positive pressure to the structural adhesive 106 upon bonding of the pressure-sensitive adhesive to the contact surface 200 of the structure 202. In other words, bonding the pressure-sensitive adhesive 108 to the contact surface 200 applies a clamping, or compression, force 206 to the structural adhesive 106 by the mounting base 102 (e.g., the mounting surface 104) and the contact surface 200 of the structure 202. The structural adhesive 106 is configured to form a permanent bond with the contact surface 200 of the structure 202, for example, after cure.

In the illustrative embodiments, the mounting base 102 includes a perimeter edge 116. The perimeter edge 116 of the mounting base 102 may also define a perimeter of the mounting surface 104 and, similarly, a perimeter of the bonding surface 110. The pressure-sensitive adhesive 108 is applied to the mounting surface 104 proximate (e.g., at or near) the perimeter edge 116. The pressure-sensitive adhesive 108 and a portion of the mounting surface 104 define or form a cavity 118. The structural adhesive 106 is disposed within the cavity 118. Thus, the pressure-sensitive adhesive 108 and the mounting surface 104 define or form the boundary of the structural adhesive 106. As an example, the perimeter edge 116 of the mounting surface 104 may define an outer perimeter edge of the pressure-sensitive adhesive 108 and an inner perimeter edge of the pressure-sensitive adhesive 108 may define an outer perimeter edge of the structural adhesive 106. In the illustrative embodiments, the relative dimensions (e.g., thicknesses) of the mounting base 102, the structural adhesive 106 and/or the pressure-sensitive adhesive 108 shown, for example, in FIGS. 2-14, may not be to scale and may be enlarged for clarity of illustration.

FIG. 3 is a schematic side elevation view, in section, of another embodiment of the disclosed device 100. In this embodiment, the mounting base 102 includes a recess 120 formed in a portion of the mounting surface 104. As an example, a mounting surface-first portion 104A is recessed relative to a mounting surface-second portion 104B. The pressure-sensitive adhesive 108 is disposed on the mounting surface-second portion 104B. The pressure-sensitive adhesive 108 and the recessed mounting surface-first portion 104A define or form the cavity 118. The structural adhesive 106 is disposed within the cavity 118. Thus, the pressure-sensitive adhesive 108 and the mounting surface-first portion 104A define or form the boundary of the structural adhesive 106.

FIGS. 15-22 are schematic (e.g., bottom) plan views of other embodiments of the disclosed device 100 and, more particularly, of the bonding surface 110 of the mounting base 102. Generally, the mounting base 102 includes a generally thin and flat body 122. The body 122 of the mounting base 102 may have any two-dimensional geometric shape 168 in cross-section, for example, defining the perimeter edge 116 of the mounting base 102. The pressure-sensitive adhesive 108 includes a shape corresponding to the geometric shape 168 of the mounting base 102. The pressure-sensitive adhesive 108 extends inwardly from the perimeter edge 116 of the mounting base 102 and defines a perimeter (e.g., the outer perimeter boundary) of the structural adhesive 106.

Figure 15:
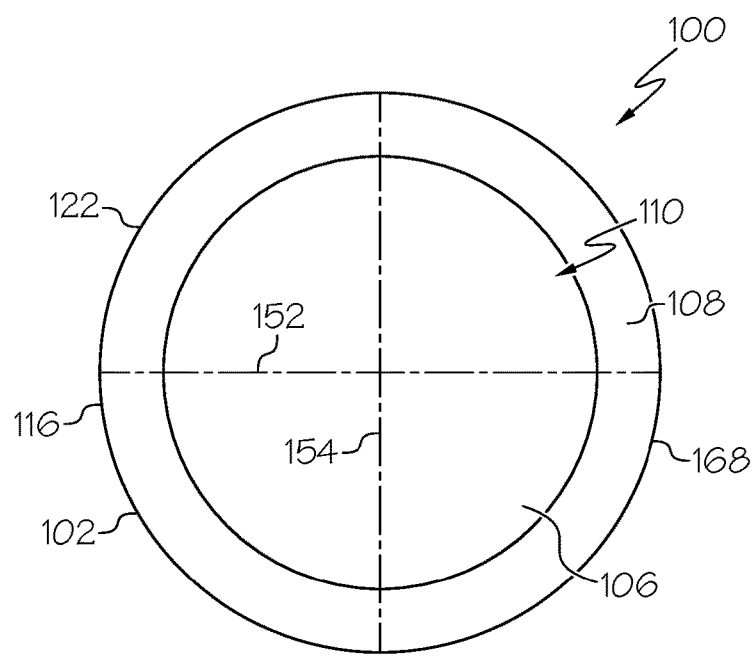
FIG. 15 is a schematic bottom plan view of another embodiment of the disclosed adhesive-bonded attachment device.

As an example, and illustrated in FIG. 15, the mounting base 102 includes a circular shape in cross-section, for example, having a disk-shaped body 122 (e.g., flat and circular). As another example, and illustrated in FIG. 16, the mounting base 102 includes an elliptical shape in cross-section. As another example, and illustrated in FIG. 17, the mounting base 102 includes a square shape in cross-section. As another example, and illustrated in FIG. 18, the mounting base 102 includes a rectangular shape in cross-section. As another example, and illustrated in FIGS. 19 and 20, the mounting base 102 includes a triangular shape in cross-section. As yet another example, and illustrated in FIGS. 21 and 22, the mounting base 102 includes an octagonal shape in cross-section. In other examples, the mounting base 102 may include other polygonal shapes having any number of sides (e.g., a pentagonal shape, a hexagonal shape, etc.).

The particular shape 168 of the mounting base 102 may depend upon the contact surface 200 and/or the type and/or direction of a load (FIG. 23) to be applied to the device 100 once attached to the structure 202.

FIG. 4 is a schematic side elevation view, in section, of another embodiment of the disclosed device 100. In this embodiment, the structural adhesive 106 is a curable adhesive that hardens in response to a reaction to UV light 208, for example, generated by a UV light source 210. In this embodiment, at least the mounting base 102 includes, or is formed from, a transparent material 124 configured to transmit the UV light 208 to the structural adhesive 106 to cure the structural adhesive 106. Optionally, the post 112 may also be formed from the transparent material 124.

In an example implementation of this embodiment, the UV light curable structural adhesive 106 may be applied directly to the mounting surface 104 within the cavity 118 formed by the mounting surface 104 and the pressure-sensitive adhesive 108. As an example, the cavity 118 may be manually filled with the structural adhesive 106 prior to seating the device 100 on the contact surface 200 of the structure 202 and the application of the external force 204 (FIG. 1) to bond the pressure-sensitive adhesive 108 to the contact surface 200. In this embodiment, the device 100 may also include a removable release liner (not shown) attached to the bonding surface 110 formed by the structural adhesive 106 and the pressure-sensitive adhesive 108 to protect the structural adhesive 106 and the pressure-sensitive adhesive 108 until the liner is removed.

Figure 5:
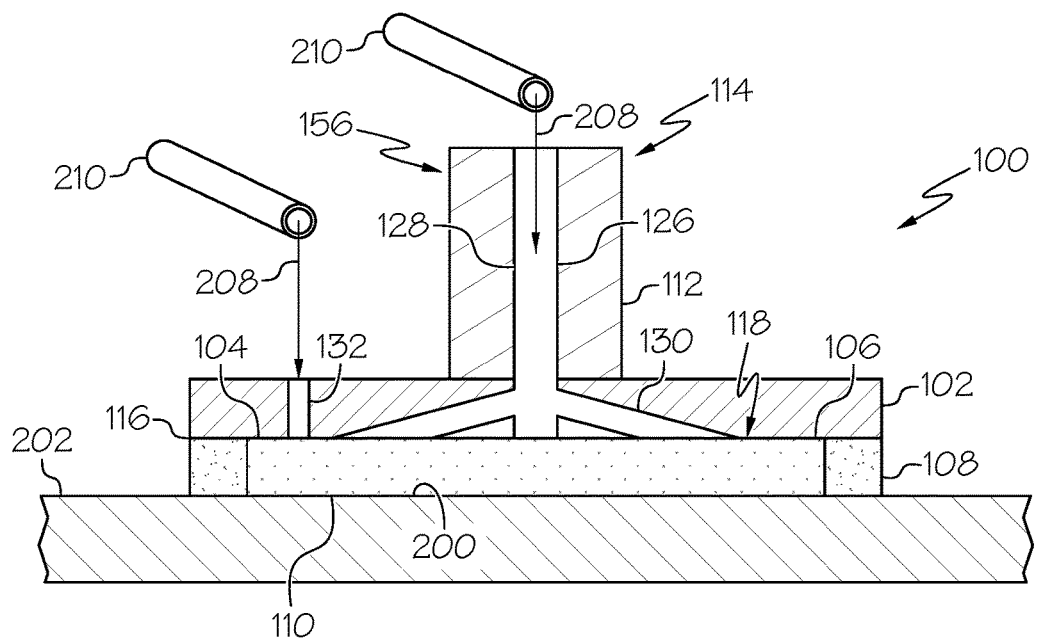
FIG. 5 is a schematic side elevation view, in section, of another embodiment of the disclosed adhesive-bonded attachment device.

FIG. 5 is a schematic side elevation view, in section, of another embodiment of the disclosed device 100. In this embodiment, the structural adhesive 106 is the curable adhesive that hardens in response to the reaction to UV light 208, for example, generated by the UV light source 210. In this embodiment, the device 100 also includes a channel 126 extending through the mounting base 102 to the cavity 118. Depending upon the configuration of the attachment feature 156, the location of the attachment feature 156 on the mounting base 102 and/or the location of the channel 126, the channel 126 may also extend through the attachment feature 156. As an example, and as illustrated in FIG. 5, the channel 126 may extend through the attachment feature 156 (e.g., the post 112) and the mounting base 102 to the cavity 118.

As an example, the channel 126 is an optical channel 128 configured to transmit the UV light 208 to the structural adhesive 106 to cure the structural adhesive 106. In an example embodiment, and as illustrated in FIG. 5, the channel 126 may diverge into a plurality of optical channel-branches 130 extending through and distributed throughout the mounting base 102 configured to transmit the UV light 208 throughout the structural adhesive 106. In another embodiment, and as also illustrated in FIG. 5, alternatively or in addition to the optical channel 128, the device 100 may also include a plurality of optical sub-channels 132 extending through and distributed throughout the mounting base 102 configured to transmit the UV light 208 to the structural adhesive 106. As an example, the optical channel 128, including the optical channel-branches 130, and/or the optical sub-channels 132 may be optical fiber (e.g., one or more fiber optic cables) embedded within the post 112 and/or the mounting base 102 and configured to transmit the UV light 208. As another example, the optical channel 128, including the optical channel-branches 130, and/or the optical sub-channels 132 may be a hollow passage formed through the post 112 and/or the mounting base 102 and having interior surfaces configured to reflect the UV light 208.

In an example implementation of this embodiment, the UV light curable structural adhesive 106 may be applied directly to the mounting surface 104 within the cavity 118 formed by the mounting surface 104 and the pressure-sensitive adhesive 108. As an example, the cavity 118 may be manually filled with the structural adhesive 106 prior to seating the device 100 on the contact surface 200 of the structure 202 and the application of the external force 204 (FIG. 1) to bond the pressure-sensitive adhesive 108 to the contact surface 200. In this embodiment, the device 100 may also include a removable release liner (not shown) attached to the bonding surface 110 formed by the structural adhesive 106 and the pressure-sensitive adhesive 108 to protect the structural adhesive 106 and the pressure-sensitive adhesive 108 until the liner is removed.

Figure 8:
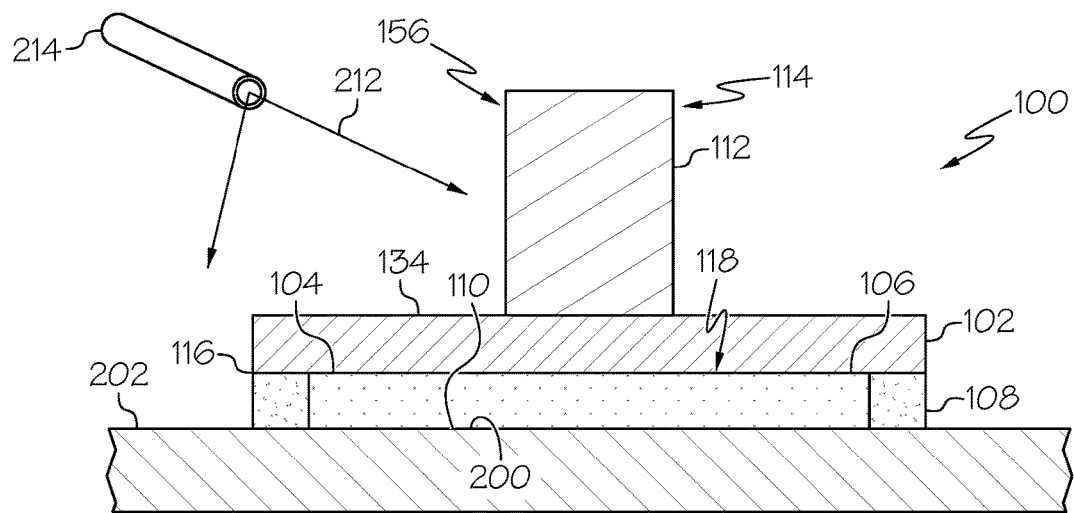
FIG. 8 is a schematic side elevation view, in section, of another embodiment of the disclosed adhesive-bonded attachment device.

FIG. 8 is a schematic side elevation view, in section, of another embodiment of the disclosed device 100. In this embodiment, the structural adhesive 106 is the curable adhesive that hardens in response to the reaction to heat 212, for example, generated by a heat source 214. As an example, the heat 212 may melt the structural adhesive 106 and the structural adhesive 106 cures when cooled. In this embodiment, at least the mounting base 102 includes, or is formed from, a thermally conductive material 134 configured to transmit the heat 212 to the structural adhesive 106 to cure the structural adhesive 106. Optionally, the post 112 may also be formed from the thermally conductive material 134.

In an example implementation of this embodiment, the heating/cooling curable structural adhesive 106 may be applied directly to the mounting surface 104 within the cavity 118 formed by the mounting surface 104 and the pressure-sensitive adhesive 108. As an example, the cavity 118 may be manually filled with the structural adhesive 106 prior to seating the device 100 on the contact surface 200 of the structure 202 and the application of the external force 204 (FIG. 1) to bond the pressure-sensitive adhesive 108 to the contact surface 200. In this embodiment, the device 100 may also include a removable release liner (not shown) attached to the bonding surface 110 formed by the structural adhesive 106 and the pressure-sensitive adhesive 108 to protect the structural adhesive 106 and the pressure-sensitive adhesive 108 until the liner is removed.

Figure 6:
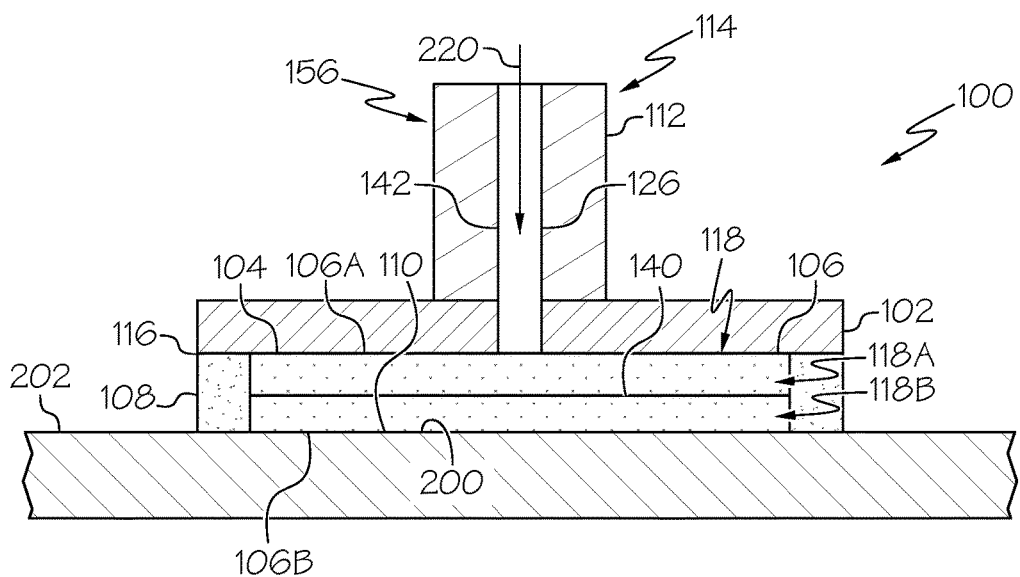
FIG. 6 is a schematic side elevation view, in section, of another embodiment of the disclosed adhesive-bonded attachment device.

FIG. 6 is a schematic side elevation view, in section, of another embodiment of the disclosed device 100. In this embodiment, the structural adhesive 106 is the two-component adhesive system that includes a structural adhesive-first component 106A (e.g., a hardener) and a structural adhesive-second component 106B (e.g., a resin). In this embodiment, the device 100 also includes a separator membrane 140 disposed within the cavity 118 and separating the cavity 118 into a first compartment 118A and a second compartment 118B. The structural adhesive-first component 106A is disposed within the first compartment 118A and the structural adhesive-second component 106B is disposed within the second compartment 118B. In this embodiment, the device 100 also includes the channel 126 extending through the mounting base 102 to the cavity 118. As described above, depending upon the configuration of the attachment feature 156, the location of the attachment feature 156 on the mounting base 102 and/or the location of the channel 126, the channel 126 may also extend through the attachment feature 156. As an example, and as illustrated in FIG. 6, the channel 126 may extend through the attachment feature 156 (e.g., the post 112) and the mounting base 102 to the cavity 118.

As an example, the channel 126 is piercing channel 142 configured to transmit a piercing force 220 into the cavity 118. The piercing force 220 is configured to puncture the separator membrane 140 and mix the structural adhesive-first component 106A and the structural adhesive-second component 106B together. As an example, the piercing channel 142 may be a hollow passage formed through the post 112 and the mounting base 102 and into the cavity 118. As an example, the piercing force 220 may be generated by compressed air transferred through the piercing channel 142 that punctures the separator membrane 140 and mixes the structural adhesive-first component 106A and the structural adhesive-second component 106B together. As another example, the piercing force 220 may be generated by a tool extending through the piercing channel 142 that punctures the separator membrane 140 and mixes the structural adhesive-first component 106A and the structural adhesive-second component 106B together.

In an example implementation of this embodiment, the two-component curable structural adhesive 106 may be applied directly to the mounting surface 104 within the cavity 118 formed by the mounting surface 104 and the pressure-sensitive adhesive 108. As an example, the first compartment 118A may be filled with the structural adhesive-first component 106A, then the separator membrane 140 may be installed, and then the second compartment 118B may be filled with the structural adhesive-second component 106B. In this embodiment, the device 100 may also include a removable release liner (not shown) attached to the bonding surface 110 formed by the structural adhesive-second component 106B and the pressure-sensitive adhesive 108 to protect the structural adhesive 106 and the pressure-sensitive adhesive 108 until the liner is removed.

In another example embodiment, the two-component structural adhesive system may be pre-mixed and applied directly to the mounting surface 104 within the cavity 118 formed by the mounting surface 104 and the pressure-sensitive adhesive 108. As an example, the structural adhesive-first component 106A and the structural adhesive-second component 106B may be manually mixed to form the curable structural adhesive 106 and the cavity 118 may be manually filled with the structural adhesive 106 prior to seating the device 100 on the contact surface 200 of the structure 202 and the application of the external force 204 (FIG. 1) to bond the pressure-sensitive adhesive 108 to the contact surface 200.

Figure 7:
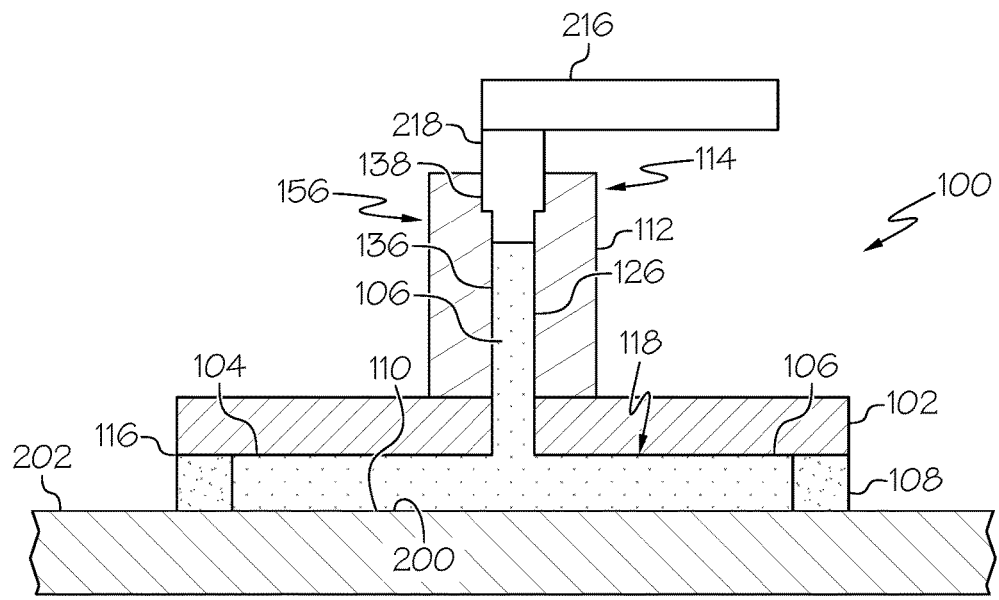
FIG. 7 is a schematic side elevation view, in section, of another embodiment of the disclosed adhesive-bonded attachment device.

FIG. 7 is a schematic side elevation view, in section, of another embodiment of the disclosed device 100. In this embodiment, the structural adhesive 106 is a flowable adhesive. In this embodiment, the device 100 also includes the channel 126 extending through the mounting base 102 to the cavity 118. As described above, depending upon the configuration of the attachment feature 156, the location of the attachment feature 156 on the mounting base 102 and/or the location of the channel 126, the channel 126 may also extend through the attachment feature 156. As an example, and as illustrated in FIG. 7, the channel 126 may extend through the attachment feature 156 (e.g., the post 112) and the mounting base 102 to the cavity 118.

As an example, the channel 126 is an injection channel 136 formed through the mounting base 102 and, optionally, the attachment feature 156, to the cavity 118 and configured to transfer the flowable structure adhesive 106 into the cavity 118, for example, from a structural adhesive source 216. As an example, the injection channel 136 may be a hollow passage formed the mounting base 102, or through the attachment feature 156 (e.g., the post 112) and the mounting base 102, and into the cavity 118. The device 100 may also include a compression, or injection, port 138 in communication with the injection channel 136. As an example, and as illustrated in FIG. 7, the compression port 138 may be formed in the attachment feature 156, for example, in the end of the post 112. As another example (not shown), the compression port 138 may be formed in the mounting base 102. The compression port 138 may be configured to engage a compression fitting 218 (e.g., a Zerk fitting) of the structural adhesive source 216.

In an example implementation of this embodiment, the cavity 118 may be filled with the structural adhesive 106 after seating the device 100 on the contact surface 200 of the structure 202 and the application of the external force 204 (FIG. 1) to bond the pressure-sensitive adhesive 108 to the contact surface 200.

As an example of the embodiment illustrated in FIG. 7 the flowable structural adhesive 106 injected into the cavity 118 through the injection channel 136 may be the UV light-cured structural adhesive. As such, the structural adhesive 106 may be cured via the reaction to UV light 208 and the device 100 may be made of the transparent material 124, as illustrated in FIG. 4.

As another example of the embodiment illustrated in FIG. 7, the flowable structural adhesive 106 injected into the cavity 118 through the injection channel 136 may be the UV light-cured structural adhesive. As such, the structural adhesive 106 may be cured via the reaction to UV light 208 and the device 100 may include the optical channel 128 and/or the sub-channels 132 formed through the post 112 and/or the mounting base 102, as illustrated in FIG. 5.

As another example of the embodiment illustrated in FIG. 7, the flowable structural adhesive 106 injected into the cavity 118 through the injection channel 136 may be the heat/cool cycle-cured structural adhesive. As such, the structural adhesive 106 may be cured via the reaction to heat 212 and the device 100 may be made of the thermally conductive material 134, as illustrated in FIG. 8.

As yet another example of the embodiment illustrated in FIG. 7, the flowable structural adhesive 106 injected into the cavity 118 through the injection channel 136 may be the pre-mixed two-component structural adhesive system. As such, the structural adhesive 106 may be cured over time via the chemical reaction between the structural adhesive-first component 106A and the structural adhesive-second component 106B.

In any of the embodiments disclosed herein above, the volume of the structural adhesive 106 is substantially equal to the volume of the cavity 118. In other words, the structural adhesive 106 substantially (e.g., completely or nearly) fills the cavity 118 such that when the device 100 is seated on the contact surface 200 of the structure 202 and the external force 204 (FIG. 2) is applied to the device 100 to bond the pressure-sensitive adhesive 108 to the contact surface 200, the clamping force 206, or the continuous positive pressure, is created to marry the structure adhesive 106 to the contact surface 200 and maintained by the pressure-sensitive adhesive 108 during cure of the structural adhesive 106.

Figure 9:
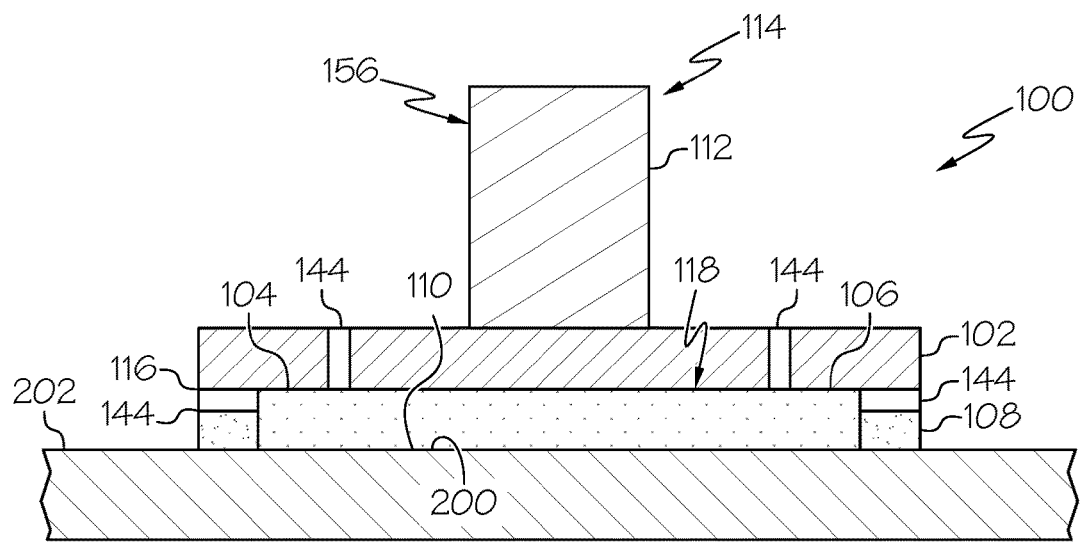
FIG. 9 is a schematic side elevation view, in section, of another embodiment of the disclosed adhesive-bonded attachment device.

FIG. 9 is a schematic side elevation view, in section, of another embodiment of the disclosed device 100. In this embodiment, the structural adhesive 106 may be applied directly to the mounting surface 104 filling the cavity 118 before seating the device 100 on the contact surface 200 of the structure 202 and the application of the external force 204 (FIG. 1) to bond the pressure-sensitive adhesive 108 to the contact surface 200. In this embodiment, the device 100 may include at least one exhaust port 144 disposed, or formed, through the mounting base 102 to the cavity 118. As an example, one or more exhaust ports 144 may extend through the mounting base 102 generally perpendicular to the mounting surface 104. As another example, one or more exhaust ports 144 may extend through the mounting base 102 and/or the pressure-sensitive adhesive 108 generally parallel to the mounting surface 104. The exhaust ports 144 are configured allow a small amount of the structural adhesive 106 to exit the cavity 118 when the external force 204 (FIG. 2) is applied to the device 100 to bond the pressure-sensitive adhesive 108 to the contact surface 200 and generate a back pressure suitable to maintain the clamping force 206, or the continuous positive pressure, on the structural adhesive 106. Additionally, the exhaust ports 144 may provide a visual indication of an appropriate amount of the external force 204 applied to the device 100 sufficient to create a sufficient clamping force 206 on the structural adhesive 106 to bond the structural adhesive 106 to the contact surface 200. As an example, when the appropriate external force 204 is applied to the device 100, a small amount of the structural adhesive 106 may become visible within the exhaust ports 144 (e.g., squeeze out), thus, indicating the sufficient clamping force 206 is being applied or has been achieved.

Figure 10:
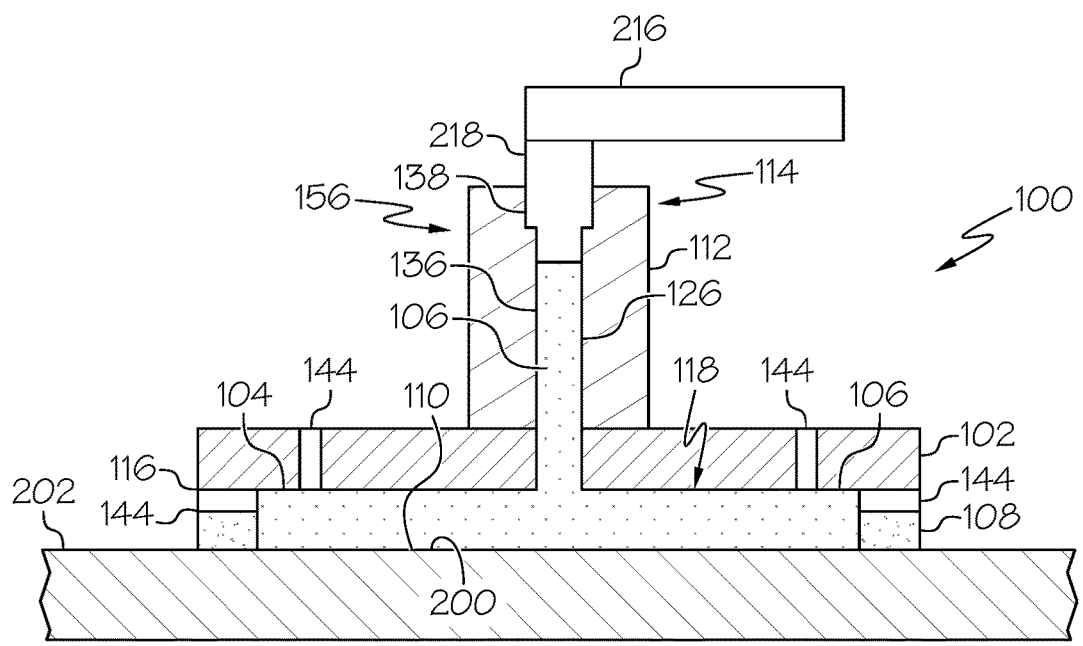
FIG. 10 is a schematic side elevation view, in section, of another embodiment of the disclosed adhesive-bonded attachment device.

FIG. 10 is a schematic side elevation view, in section, of another embodiment of the disclosed device 100. In this embodiment, the cavity 118 may be filled with the structural adhesive 106 by injection through the channel 126 (e.g., the injection channel 136) after seating the device 100 on the contact surface 200 of the structure 202 and the application of the external force 204 (FIG. 1) to bond the pressure-sensitive adhesive 108 to the contact surface 200, as described above and with reference to FIG. 8. In this embodiment, the device 100 may include at least one exhaust port 144 disposed, or formed, through the mounting base 102 to the cavity 118. As an example, one or more exhaust ports 144 may extend through the mounting base 102 generally perpendicular to the mounting surface 104. As another example, one or more exhaust ports 144 may extend through the mounting base 102 and/or the pressure-sensitive adhesive 108 generally parallel to the mounting surface 104. The exhaust ports 144 are configured allow a small amount of the structural adhesive 106 to exit the cavity 118 when the cavity 118 is filled with the structural adhesive 106 (e.g., during injection of the structural adhesive 106) and generate a back pressure suitable to maintain the clamping force 206, or the continuous positive pressure, on the structural adhesive 106. Additionally, the exhaust ports 144 may provide a visual indication that an appropriate volume of the structural adhesive 106 has been filled within the cavity 118 needed to create a sufficient clamping force 206 on the structural adhesive 106 to bond the structural adhesive 106 to the contact surface 200. As an example, when the appropriate volume of the structural adhesive 106 has filled the cavity 118, a small amount of the structural adhesive 106 may become visible within the exhaust ports 144, (e.g., squeeze out), thus, indicating an appropriate volume of the structural adhesive 106 has been injected into the cavity 118 and/or that the sufficient clamping force 206 is applied or has been achieved.

The geometry and/or dimensions of the exhaust ports 144 may depend upon various factors, such as the type of structural adhesive 106. The geometry and/or dimensions of the exhaust ports 144 may be configured to ensure adequate pressure is maintained on the structural adhesive 106 during cure. Generally, the smaller the exhaust port 144, the higher the back pressure that is induced and the greater the clamping force 206 that is created, and the larger the exhaust port 144, the lower the back pressure is induced and the lesser the clamping force 206 that is created.

The distribution of the structural adhesive 106 and the pressure-sensitive adhesive 108 forming the bonding surface 110 may vary. As an example, the ratio of the portion of the surface area of the bonding surface 110 defined by the structural adhesive 106 to the portion of the surface area of the bonding surface 110 defined by the pressure-sensitive adhesive 108 may depend the load requirements of the device 100. As an example, the lower the load capacity required by the device 100, the greater the ratio of the pressure-sensitive adhesive 108 to the structural adhesive 106. As another example, the greater the load capacity required by the device 100, the greater the ratio of the structural adhesive 106 to the pressure-sensitive adhesive 108.

As another example, the ratio of the portion of the surface area of the bonding surface 110 defined by the structural adhesive 106 to the portion of the surface area of the bonding surface 110 defined by the pressure-sensitive adhesive 108 may depend upon the clamping force 206 (FIG. 2) required by the pressure-sensitive adhesive 108 for bonding the structural adhesive 106. As an example, the greater the clamping force 206 required, the greater the ratio of the pressure-sensitive adhesive 108 to the structural adhesive 106. As another example, lesser the clamping force 206 required, the greater the ratio of the structural adhesive 106 to the pressure-sensitive adhesive 108.

As another example, the ratio of the portion of the surface area of the bonding surface 110 defined by the structural adhesive 106 to the portion of the surface area of the bonding surface 110 defined by the pressure-sensitive adhesive 108 may depend upon the aspect ratio of the mounting base 102. The aspect ratio of the mounting base 102 may depend upon the load requirements of the device 100.

Figure 16:
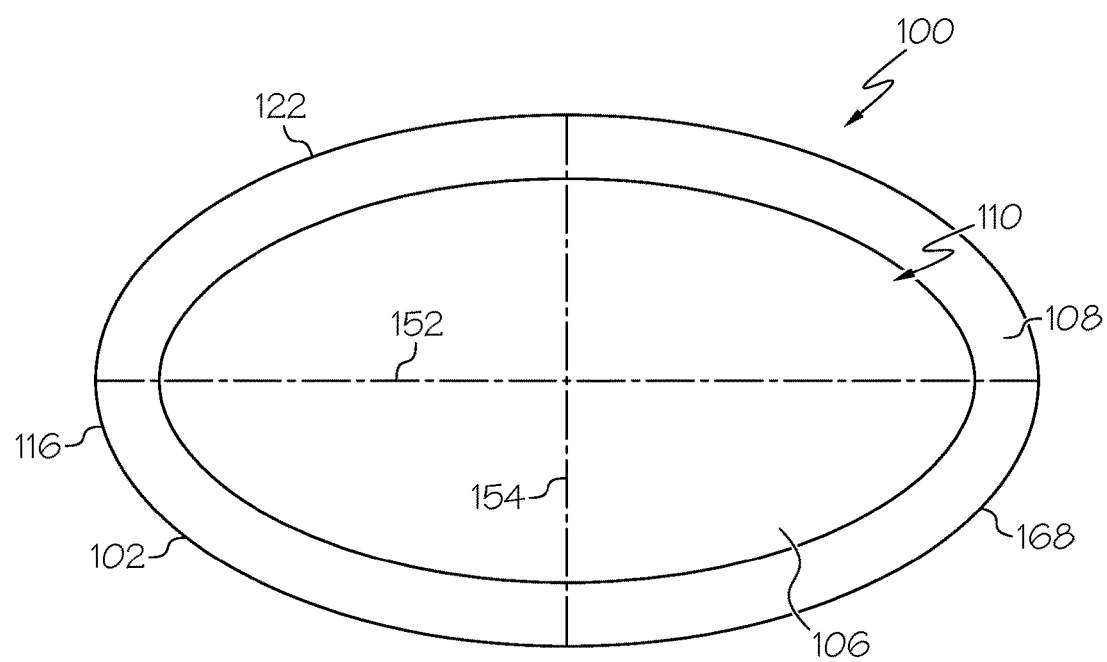
FIG. 16 is a schematic bottom plan view of another embodiment of the disclosed adhesive-bonded attachment device.
Figure 17:
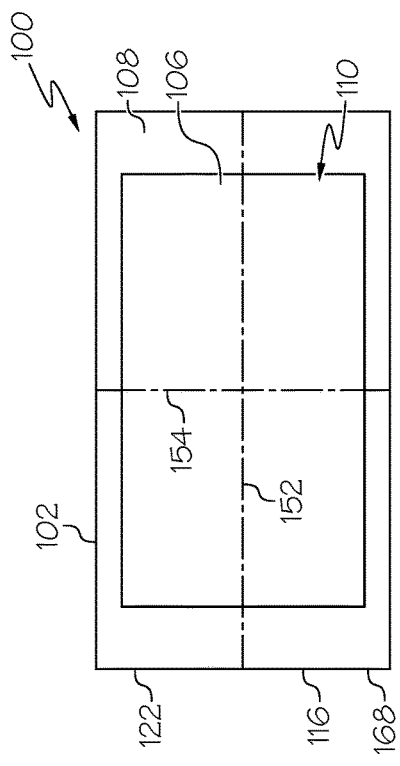
FIG. 17 is a schematic bottom plan view of another embodiment of the disclosed adhesive-bonded attachment device.
Figure 18:
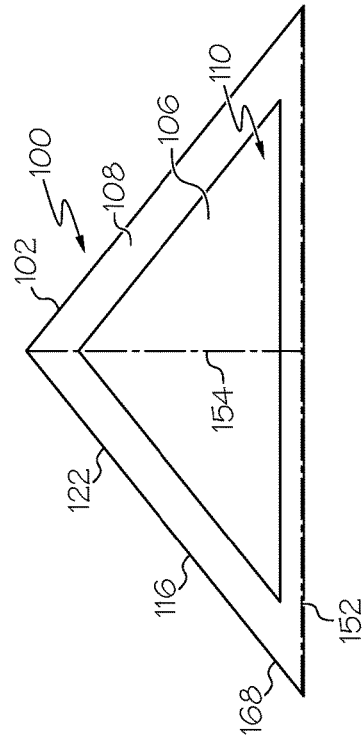
FIG. 18 is a schematic bottom plan view of another embodiment of the disclosed adhesive-bonded attachment device.
Figure 19:
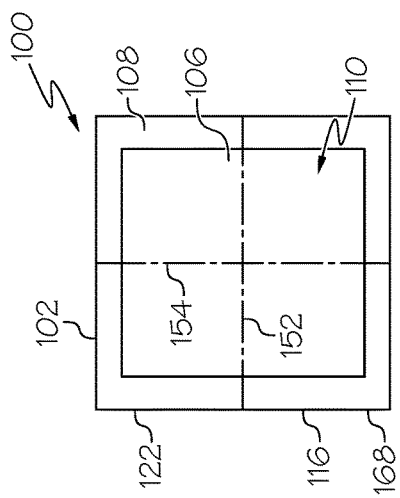
FIG. 19 is a schematic bottom plan view of another embodiment of the disclosed adhesive-bonded attachment device.
Figure 20:
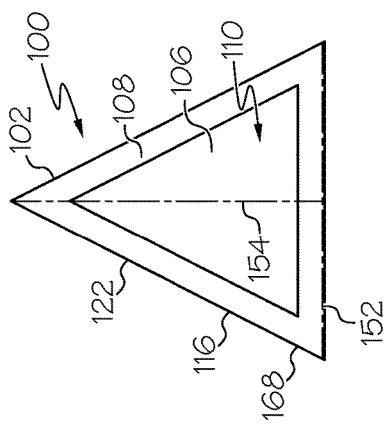
FIG. 20 is a schematic bottom plan view of another embodiment of the disclosed adhesive-bonded attachment device.

Referring to FIGS. 11-22, in the various embodiments of the device 100 disclosed herein, the shape 168 of the mounting base 102 and, thus, the bonding surface 110, may have a first axis 152 (e.g., width) and a second axis 154 (e.g., height). FIG. 15 illustrates the mounting base 102 and, thus, the bonding surface 110, having the circular shape with the aspect ratio of the first axis 152 to the second axis 154 being approximately 1:1. FIG. 16 illustrates the mounting base 102 and, thus, the bonding surface 110, having the elliptical shape with the aspect ratio of the first axis 152 (e.g., the major axis) to the second axis 154 (e.g., the minor axis) being greater than approximately 1:1. FIG. 17 illustrates the mounting base 102 and, thus, the bonding surface 110, having the square shape with the aspect ratio of the first axis 152 to the second axis 154 being approximately 1:1. FIG. 18 illustrates the mounting base 102 and, thus, the bonding surface 110, having the rectangular shape with the aspect ratio of the first axis 152 to the second axis 154 being greater than approximately 1:1. FIG. 19 illustrates the mounting base 102 and, thus, the bonding surface 110, having the triangular shape with the aspect ratio of the first axis 152 (e.g., the base) to the second axis 154 (e.g., the height) being approximately 1:1. FIG. 20 illustrates the mounting base 102 and, thus, the bonding surface 110, having the triangular shape with the aspect ratio of the first axis 152 (e.g., the base) to the second axis 154 (e.g., the height) being greater than approximately 1:1. FIG. 21 illustrates the mounting base 102 and, thus, the bonding surface 110, having the octagonal shape with the aspect ratio of the first axis 152 to the second axis 154 being approximately 1:1. FIG. 22 illustrates the mounting base 102 and, thus, the bonding surface 110, having the octagonal shape with the aspect ratio of the first axis 152 to the second axis 154 being greater than approximately 1:1.

FIG. 23 is a schematic perspective view of another embodiment of the disclosed device 100. The orientation of the device 100 when attached to the contact surface 200 of the structure 202 and/or the aspect ratio between the first axis 152 and the second axis 154 of the geometric shape 168 of the mounting base 102 (FIGS. 15-22) may be selected, for example, based, at least in part, on the direction of the load to be applied to the device 100. As an example, and as illustrated in FIG. 23, the aspect ratio of the first axis 152 to the second axis 154 is greater than 1:1. In this example, the device 100 may have an increased capacity to take a load acting in a direction approximately parallel to the first axis 152, for example, a load applied to the device 100 in one of a first load direction 224 or a second load direction 226. Also in this example, the device 100 may have a decreased capacity to take a load acting in a direction approximately perpendicular to the first axis 152 (parallel to the second axis 154), for example, a load applied to the device 100 in one of a third load direction 228 or a fourth load direction 230. Thus, as the aspect ratio of the mounting base 102 and, thus, the bonding surface 110, increases, the capacity of the device 100 to withstand a load in a direction approximately parallel to the larger axis also increases.

Additionally, the ratio of the surface area of the bonding surface 110 defined by the structural adhesive 106 to the surface area of the bonding surface 110 defined by the pressure-sensitive adhesive 108 may be selected to vary an applied bond strength and/or load capacity of the device 100. As an example, the ratio of the surface area of the bonding surface 110 defined by the structural adhesive 106 to the surface area of the bonding surface 110 defined by the pressure-sensitive adhesive 108 may be selected, for example, based, at least in part, on the load capacity requirement of the device 100 and/or the aspect ratio of first axis 152 to the second axis 154. For example, as the aspect ratio of the mounting base 102 and, thus, the bonding surface 110, increases, the ratio of surface area of the bonding surface 110 defined by the structural adhesive 106 to the surface area of the bonding surface 110 defined by the pressure-sensitive adhesive 108 may also increase. As a non-limiting example, the ratio of the structural adhesive 106 to the pressure-sensitive adhesive 108 may be approximately 60:40, for example, for applications where the device 100 has a relative low load capacity requirement or when the aspect ratio of first axis 152 to the second axis 154 is relatively small. As another non-limiting example, the ratio of the structural adhesive 106 to the pressure-sensitive adhesive 108 may be approximately 80:20, for example, for applications where the device 100 has a relative high load capacity requirement or when the aspect ratio of first axis 152 to the second axis 154 is relatively large.

Accordingly, the disclosed device 100 enables attachment of articles and other system components to a structure, such as an aircraft, with increased efficiency and accuracy and without altering the underlying structure. Advantageously, the device 100 may reduce or eliminate the labor-intensive process of drilling holes in the structure for attachment of articles, which may also create stress concentrations about the hole. Additionally, the device 100 may reduce or eliminate the labor-intensive process of using a separate clamp to temporarily hold the adhesive-bonded fastener in place and under pressure during cure, which must be then removed after cure.

Figure 24:
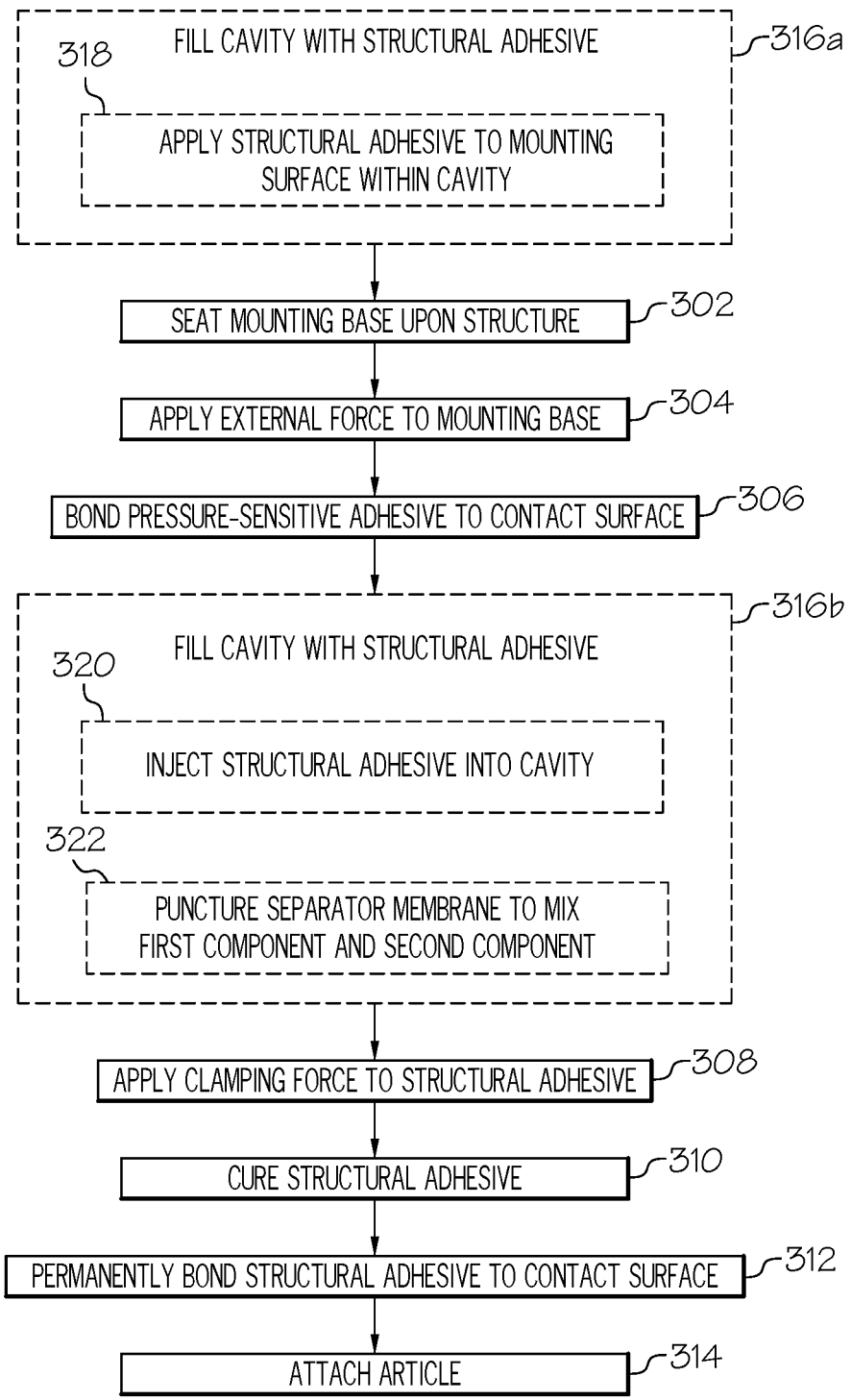
FIG. 24 is a flow diagram of an embodiment of the disclosed method for attaching an article to a structure using the disclosed adhesive-bonded attachment device.

FIG. 24 is a flow diagram of an embodiment of the disclosed method for attaching an article to the structure 202.

As shown at block 302, the mounting base 102 of the device 100 is seated upon the structure 202 such that the bonding surface 110 of the mounting base 102 engages the contact surface 200 of the structure 202. As described above, and as illustrated in FIGS. 1 and 2, the mounting base 102 includes the mounting surface 104, the pressure-sensitive adhesive 108 disposed on the mounting surface 104, the pressure-sensitive adhesive and a portion of the mounting surface 104 defining the cavity 118, and the structural adhesive 106 disposed within the cavity 118 and bordered by the pressure-sensitive adhesive 108, the structural adhesive 106 and the pressure-sensitive adhesive 108 defining the bonding surface 110.

As shown at block 304, the external force 204 (FIG. 2) is applied to the mounting base 102. Application of the external force 204 bonds the pressure-sensitive adhesive 108 to the contact surface 200 of the structure 202, as shown at block 306. Bonding the pressure-sensitive adhesive 108 to the contact surface 200 sets the volume of the cavity 118 and applies the clamping force 206 (FIG. 2) to the structural adhesive 106 disposed within the cavity 118, as shown at block 308.

As shown at block 310, the structural adhesive 106 is cured. As described above, and as illustrated in FIGS. 4-7, the structural adhesive 106 may be cured via a reaction to UV light 208, a reaction to heat 212 or a chemical reaction. Curing the structural adhesive 106 permanently bonds the structural adhesive 106 to the contact surface 200 and the mounting surface 104 of the mounting base 102, as shown at block 312.

As shown at block 314, the article is attached to the fastening fixture 114 disposed on the end of the post 112 of the device 100. As described above, as and illustrated in FIGS. 2-4 and 11, the fastening fixture 114 may be any suitable fastening mechanism configured for the attachment of the article. The article may include any object or component to be coupled to the structure 202. In an aerospace example, the article may be a transmission line (e.g., electrical transmission line, data transmission line, etc.) or any other system component of an aircraft that is coupled to the underlying structure of the aircraft.

As shown at blocks 316A and 316B, the cavity 118 may be filled with the structural adhesive 106 in various ways and at different points in the disclosed method 300. In an alternative example, the structural adhesive 106 is applied to the mounting surface 104 within the cavity 118 before seating the mounting base 102 upon the structure 202 (block 302), as shown at block 318. As another alternative example, and as illustrated in FIG. 8, the structural adhesive 106 may be injected into the cavity 118 through the channel 126 extending through the post 112 and the mounting base 102 after bonding the pressure-sensitive adhesive 108 to the contact surface 200 of the structure 202 (block 306), as shown at block 320. As another alternative example, and as illustrated in FIG. 7, the separator membrane 140 separating the cavity 118 into the first compartment 118A filled with the first component 106A of the structural adhesive 106 and the second compartment 118B filled with the second component 106B of the structural adhesive 106 may be punctured to mix the first component 106A and the second component 106B together after bonding the pressure-sensitive adhesive 108 to the contact surface 200 of the structure (block 306), as shown at block 322.

Figure 25:
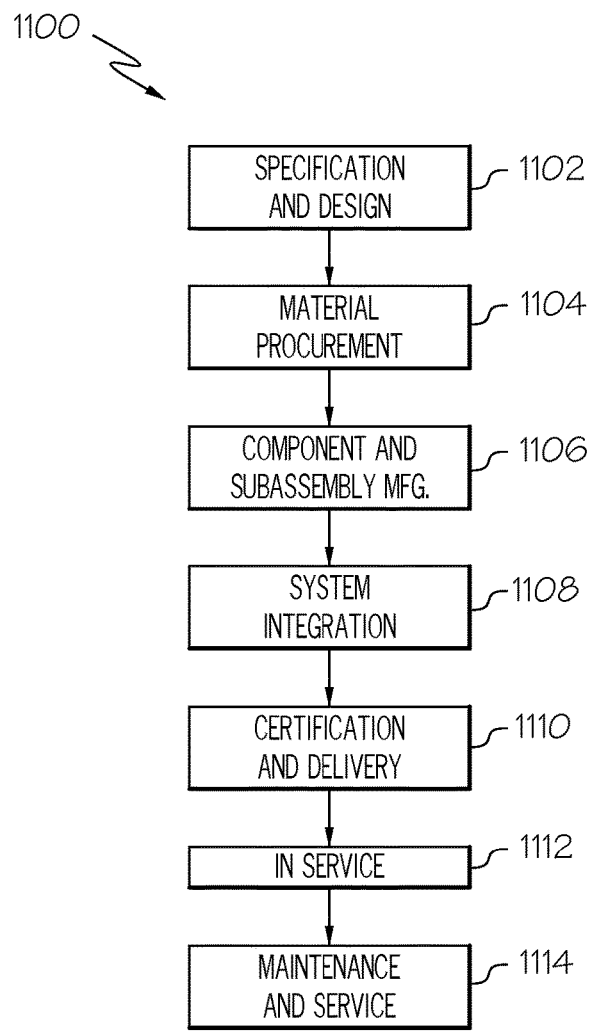
FIG. 25 is a schematic illustration of an aircraft.
Figure 26:
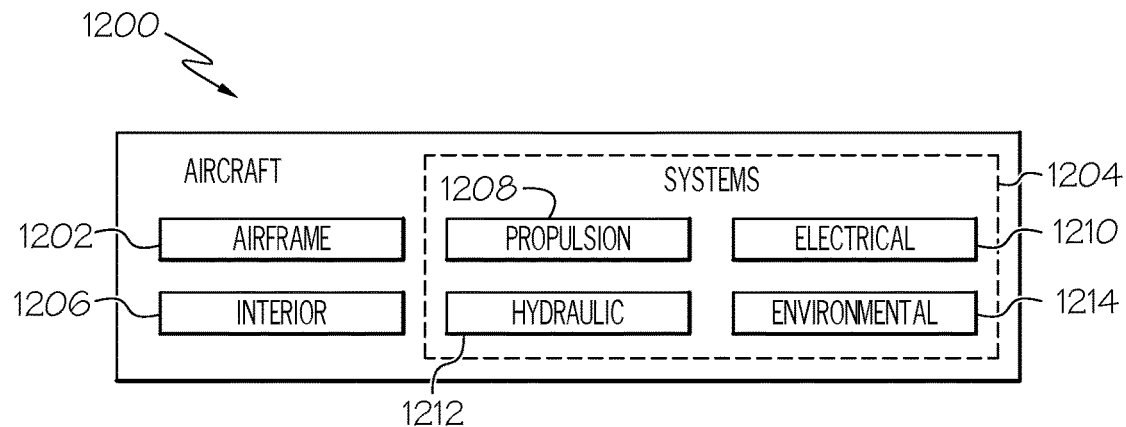
FIG. 26 is a schematic block diagram of aircraft production and service methodology.

Examples of the disclosed adhesive-bonded device 100 and the method 300 for attaching an article to the structure 202 using the adhesive-bonded device 100 disclosed herein may be described in the context of an aircraft manufacturing and service method 1100 as shown in FIG. 25 and an aircraft 1200 as shown in FIG. 26.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of the aircraft 1200 may take place. Installation of the adhesive-bonded device 100 and attachment of the article to the structure 202 (e.g., the aircraft 1200) using the adhesive-bonded device 100 as described herein, may be accomplished as a portion of the production, component and subassembly manufacturing step (block 1106) and/or as a portion of the system integration (block 1108). Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 26, the aircraft 1200 produced by the illustrative method 1100 may include an airframe 1202, a plurality of high-level systems 1204 and an interior 1206. Components or portions of one or more of the high-level systems 1204 may be attached to the airframe 1202 of the aircraft 1200 by one or more of the disclosed devices 100. Examples of the high-level systems 1204 include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while the aircraft 1200 is in service (block 1112). Also, one or more examples of the systems, apparatus, and methods, or combination thereof may be utilized during production stages (blocks 1108 and 1110). Similarly, one or more examples of the systems, apparatus, and methods, or a combination thereof, may be utilized, for example and without limitation, while the aircraft 1200 is in service (block 1112) and during maintenance and service stage (block 1114).

Reference herein to "embodiment" means that one or more feature, structure, element, component or characteristic described in connection with the embodiment is included in at least one implementation of the disclosed invention. Thus, the phrase "one embodiment," "another embodiment," and similar language throughout the present disclosure may, but do not necessarily, refer to the same embodiment. Further, the subject matter characterizing any one embodiment may, but does not necessarily, include the subject matter characterizing any other embodiment.

Similarly, reference herein to "example" means that one or more feature, structure, element, component or characteristic described in connection with the example is included in at least one embodiment. Thus, the phrases "one example," "another example," and similar language throughout the present disclosure may, but do not necessarily, refer to the same example. Further, the subject matter characterizing any one example may, but does not necessarily, include the subject matter characterizing any other example.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual. For example, the phrase "A is substantially the same as B" may encompass embodiments where A is exactly the same as B, or where A may be within a variance of +/−5%, for example of a value, of B, or vice versa.

As used herein, the terms "partially" or "at least a portion of" may represent an amount of a whole that includes an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

In FIG. 14, referred to above, solid lines, if any, connecting various elements and/or components represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines are either selectively provided or relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 16 may be combined in various ways without the need to include other features described in FIG. 16, other drawing figures, and/or the accompanying disclosure, even though such combination or combinations are not explicitly illustrated herein. Similarly, additional features not limited to the examples presented, may be combined with some or all of the features shown and described herein.

In FIGS. 13 and 15, referred to above, the blocks may represent operations and/or portions thereof and lines connecting the various blocks do not imply any particular order or dependency of the operations or portions thereof. Blocks, if any, represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 13 and 15 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various embodiments of the disclosed apparatus, systems and methods have been shown and described, modifications may occur to those skilled in the art upon reading the specification. The present application includes such modifications and is limited only by the scope of the claims.

What is claimed is:

1. An adhesive-bonded attachment device comprising:
 a mounting base comprising:
  a mounting surface;
  a structural adhesive disposed on said mounting surface;
  a pressure-sensitive adhesive disposed on said mounting surface bordering said structural adhesive;
  at least one pressure exhaust port formed in said mounting base and in fluid communication with said structural adhesive; and
 an attachment feature disposed on said mounting base,
  wherein said structural adhesive and said pressure-sensitive adhesive define a bonding surface configured to be bonded to a contact surface of a structure.

2. The device of claim 1 wherein:
 said mounting base comprises a perimeter edge,
 said pressure-sensitive adhesive is applied to said mounting surface proximate to said perimeter edge,
 said pressure-sensitive adhesive and a portion of said mounting surface define a cavity, and
 said structural adhesive is disposed within said cavity.

3. The device of claim 2 wherein said structural adhesive comprises a curable adhesive.

4. The device of claim 3 further comprising a channel extending through said mounting base to said cavity.

5. The device of claim 4 wherein said channel is configured to transmit ultraviolet light to said structural adhesive to cure said structural adhesive.

6. The device of claim 4 wherein said structural adhesive is a flowable adhesive injected through said channel filling said cavity.

7. The device of claim 4 further comprising a separator membrane separating said cavity into a first compartment and a second compartment, wherein said structural adhesive comprises a two-component adhesive system comprising a first component disposed within said first compartment and a second component disposed within said second compartment and separated from said first component by said separator membrane, and wherein said channel is configured to transmit a piercing force to puncture said separator membrane and mix said first component and said second component.

8. The device of claim 4 wherein:
said mounting base comprises a geometric shape, in cross section, defining said perimeter edge,
said pressure-sensitive adhesive comprises a shape matching said geometric shape of said mounting base, and
said pressure-sensitive adhesive extends inward from said perimeter edge of said mounting base.

9. The device of claim 8 wherein said pressure-sensitive adhesive comprises a pressure-sensitive adhesive tape.

10. The device of claim 4 wherein a ratio of said structural adhesive to said pressure-sensitive adhesive defining said bonding surface is selected to vary an applied bond strength.

11. The device of claim 3 wherein said mounting base comprises a transparent material configured to transmit ultraviolet light to said structural adhesive to cure said structural adhesive.

12. The device of claim 3 wherein said mounting base comprises a thermally conductive material configured to transmit heat to said structural adhesive to cure said structural adhesive.

13. The device of claim 3 wherein said structural adhesive is applied directly to said mounting surface filling said cavity.

14. The device of claim 3 wherein said at least one pressure exhaust port extends through said mounting base to said cavity, and wherein said pressure exhaust port maintains continuous positive pressure on said structural adhesive.

15. The device of claim 3 wherein:
said pressure-sensitive adhesive is configured to form a bond with said contact surface of said structure in response to an external force applied to said mounting base,
said mounting surface is configured to apply a positive pressure to said structural adhesive upon bonding of said pressure-sensitive adhesive to said contact surface of said structure, and
said structural adhesive is configured to form a permanent bond with said contact surface of said structure.

16. An adhesive-bonded attachment device comprising:
a mounting base comprising:
a mounting surface;
a pressure-sensitive adhesive disposed on said mounting surface, wherein said pressure-sensitive adhesive and a portion of said mounting surface define a cavity; and
a structural adhesive disposed within said cavity and bordered by said pressure-sensitive adhesive,
wherein said structural adhesive and said pressure-sensitive adhesive define a bonding surface configured to be bonded to a contact surface of a structure;
an attachment feature disposed on said mounting base, wherein said attachment feature comprises a fastening fixture opposite said mounting base; and
at least one pressure exhaust port extending through said mounting base to said cavity, wherein said pressure exhaust port maintains positive pressure on said structural adhesive when said pressure-sensitive adhesive is bonded to said contact surface of said structure.

17. The device of claim 16 further comprising a channel extending through said mounting base to said cavity, wherein said structural adhesive is a flowable adhesive injected through said channel filling said cavity.

18. The device of claim 16 further comprising:
a channel extending through said mounting base to said cavity; and
a separator membrane separating said cavity into a first compartment and a second compartment, wherein:
said structural adhesive comprises a two-component adhesive system comprising a first component disposed within said first compartment and a second component disposed within said second compartment and separated from said first component by said separator membrane, and
said channel is configured to transmit a piercing force to puncture said separator membrane and mix said first component and said second component.

19. A method for attaching an article to a structure using said device of claim 1, said method comprising:
seating said mounting base of said device upon said structure such that said bonding surface of said mounting base engages a contact surface of said structure;
applying an external force to said mounting base;
bonding said pressure-sensitive adhesive to said contact surface of said structure;
applying a clamping force to said structural adhesive;
curing said structural adhesive;
permanently bonding said structural adhesive to said contact surface of said structure; and
attaching said article to a fastening fixture disposed on an end of a post extending from said mounting base.

20. The method of claim 19 further comprising filling said cavity with said structural adhesive, wherein filling said cavity with said structural adhesive comprises one of:
applying said structural adhesive to said mounting surface within said cavity before seating said mounting base upon said structure;
injecting said structural adhesive into said cavity through a channel extending through said mounting base after bonding said pressure-sensitive adhesive to said contact surface of said structure; and
puncturing a separator membrane separating said cavity into a first compartment filled with a first component of said structural adhesive and a second compartment filled with a second component of said structural adhesive to mix said first component and said second component together after bonding said pressure-sensitive adhesive to said contact surface of said structure.

* * * * *